United States Patent [19]

Shiga

[11] Patent Number: 5,442,765
[45] Date of Patent: Aug. 15, 1995

[54] DATABASE SYSTEM WHICH ADJUSTS THE DATA STORAGE ORDER BASED ON THE PROCESSING SPEED OF THE STORAGE MEDIA

[75] Inventor: Shoji Shiga, Tokyo, Japan

[73] Assignee: NEC Corporation, Tokyo, Japan

[21] Appl. No.: 810,157

[22] Filed: Dec. 19, 1991

[30] Foreign Application Priority Data

Dec. 20, 1990 [JP] Japan .................................. 2-412281

[51] Int. Cl.⁶ .............................................. G06F 13/00
[52] U.S. Cl. ................................ 395/600; 364/964.2; 364/964.6; 364/969.2; 364/DIG. 2; 395/444; 395/483; 395/494; 395/485
[58] Field of Search ............... 395/425, 250, 275, 600, 395/400, 650; 340/172.5

[56] References Cited

U.S. PATENT DOCUMENTS

| | | | |
|---|---|---|---|
| 3,623,006 | 11/1971 | Balakian et al. | 340/172.5 |
| 4,561,051 | 12/1985 | Rodman et al. | 364/200 |
| 4,604,694 | 8/1986 | Hough | 395/650 |
| 4,901,232 | 2/1990 | Harrington et al. | 395/275 |
| 4,939,644 | 7/1990 | Harrington et al. | 395/275 |
| 5,140,683 | 8/1992 | Gallo et al. | 395/425 |
| 5,226,143 | 7/1993 | Baird et al. | 395/425 |
| 5,276,867 | 1/1994 | Kenley et al. | 395/600 |

*Primary Examiner*—Thomas G. Black
*Assistant Examiner*—Larry T. Ellcessor
*Attorney, Agent, or Firm*—Foley & Lardner

[57] ABSTRACT

This database system stores a plurality of storage units distributed to different types of memory media with different processing speeds. When storage units from the database accessible from a plurality of processing programs are read to a plurality of means for storing, the system places the applicable storage units under exclusive control to prevent them from being used by other processing programs and at the same time stores which memory medium is the source of the storage units read to the means for storing. When the storage units read to the means for storing have been updated, reference is made to the means for medium storing so that priority can be placed to the storage units whose source is the highest speed memory medium for writing to the database and for releasing of storage units from exclusive control upon completion of writing.

7 Claims, 6 Drawing Sheets

DATABASE SYSTEM WHICH ADJUSTS THE DATA STORAGE ORDER BASED ON THE PROCESSING SPEED OF THE STORAGE MEDIA

BACKGROUNDS OF THE INVENTION

1. Field of the Invention

This invention relates to a database system for storing a database divided into a plurality of storage units by distributing the storage units to a low-speed memory medium and a high-speed memory medium, and more particularly relates to the improvement of an exclusive control method to prevent simultaneous updating of the same storage unit by a plurality of database processing programs in the database system.

2. Description of the Prior Art

One database system is provided with a database comprising a plurality of areas called "storage units", a plurality of system buffers designated by a series of numbers to temporarily store the storage units accessed by processing programs for retrieval and updating.

This system prevents simultaneous updating of the same storage unit by a plurality of processing programs and at the same time enables sharing of the database by a plurality of processing programs for retrieval and updating. For this purpose, each storage unit is separately put to exclusive control status according to the exclusive control table and the updated storage units are kept under exclusive control until completion of the processing program. For example, when the processing program requests retrieval processing of a certain storage unit, the applicable storage unit is read from the database and stored to the system buffer. Thus, the storage unit can be accessed by the processing program. At the same time, the exclusive control table is updated to place that storage unit under exclusive control. Next, when a processing program terminates the operation, the storage units which the processing program stored in the system buffers is written to the database in numerical order beginning with the buffer of the smallest number. When all the updated storage units are written to the database, the exclusive control table is updated so that the written storage units are released from the exclusive control. Thus, updated storage units can be accessed from other processing programs.

The database systems perform and release the exclusive control for storage units as mentioned above, but this method had a drawback.

Updated storage units among those stored in the system buffer for the completed processing program are written to the database beginning with the ones in the system buffer of the smallest number, and the storage units are released only when all the updated storage units are written to the database. For this reason, exclusive control of storage units is not released soon after completion of the processing program. This makes waiting time longer and the throughput of the whole system declines.

SUMMARY OF THE INVENTION

This invention is intended to solve the above mentioned drawback of database systems. An object of the invention is to improve the throughput of the whole system through reduction of the average exclusive control period for storage units by adopting an exclusive control method where a higher speed medium takes priority in exclusion release.

According to a preferred embodiment of this invention to attain the object, the database system has a database which stores a plurality of storage units distributed to different types of memory media of different processing speeds and is accessible from a plurality of processing programs, a plurality of storage means to temporarily hold the storage units read from the database, a means for exclusive control to prevent access from other processing programs by placing the storage unit under exclusive control upon reading of the storage unit to the above storage means and a medium storing means to store the source memory medium of the storage unit read to the above storage means. When the system writes the storage units read to and updated in the above storage means to the above database, it refers to the above medium storing means and places priority to the storage units from the highest speed memory medium and releases the applicable storage units from exclusive control by the above exclusive control means upon completion of writing.

According to a preferred embodiment, the system comprises an input/output means for reading of storage units from the above database to the above storage means and writing from the above storage means to the above database and a control means to control reading from and writing to the above storage means using the input/output means. The input/output means reads the applicable storage units to the above storage means according to the reading instruction from the control means, updates the exclusive control means so that the applicable storage units are placed under exclusive control, and stores the source memory media of the storage units read to the storage means to the above medium storing means. The above input/output means, according to the writing instruction from the above control means for the updated storage units, refers to the medium storing means to perform writing to the aforementioned database placing priority to the storage units whose source is the highest speed memory medium and releases the applicable storage units from exclusive control by updating the above exclusive control means upon completion of writing.

According to a more preferred embodiment, the memory medium of the database comprises the first memory medium for high-speed reading and writing and the second memory medium which reads and writes at a lower speed than the first memory medium. The first memory medium may be, for example, an electronic disk, and the second low-speed memory medium may be a magnetic disk.

According to a still more preferred embodiment, the memory medium of the database comprises the first memory medium for high-speed reading and writing, the second memory medium which reads and writes at a lower speed than the first medium and the third memory medium which reads and writes at a lower speed than the second medium. For example, the first memory medium may be an electronic disk, the second memory medium may be an optical disk, and the third memory medium may be a magnetic disk.

Still other objects and effects of the present invention will be clarified by the following description in detail.

DESCRIPTION OF THE PREFERRED EMBODIMENT

Referring to FIGS. 1 to 6, a preferred embodiment of this invention is described below.

Figure 1:
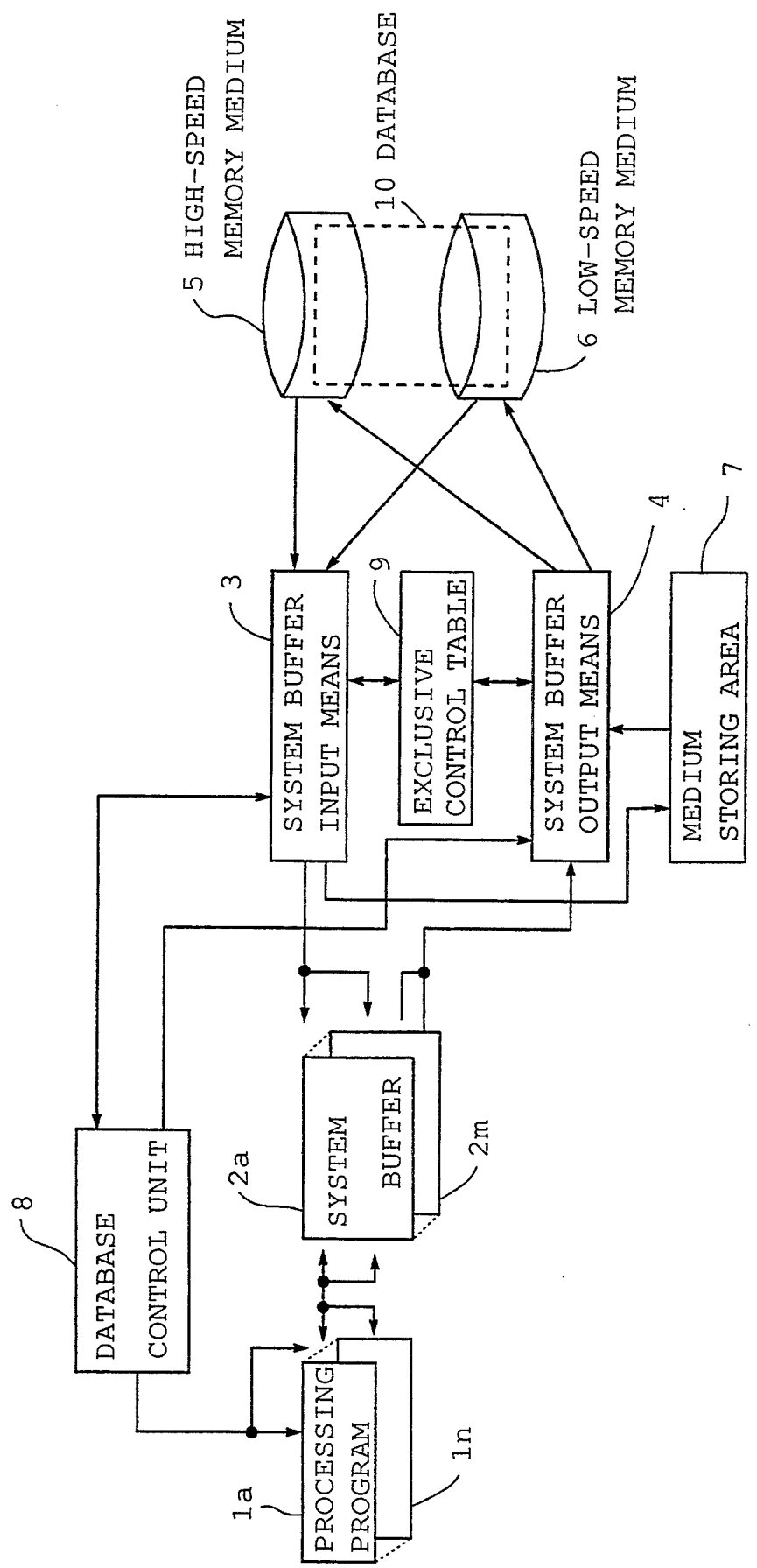
FIG. 1 is a block diagram showing the configuration of a database system according to a first embodiment of the present invention.

Referring to FIG. 1, a database system according to this embodiment comprises a database 10 which is divided into a plurality of storage units, a plurality of system buffers 2a to 2m to which the processing programs 1a to 1n read the storage units to be retrieved and updated, a medium storing area 7, a database control unit 8 which controls the whole database system, an exclusive control table 9 which sets exclusive control for storage units, a system buffer input means 3 which reads applicable storage units from the database 10 and stores them to the system buffers 2a to 2m, and a system buffer output means 4 which writes the storage units stored in the system buffers 2a to 2m to the database.

The database 10 comprises a high-speed memory medium 5 such as an electronic disk, which is capable of high-speed reading and writing and a low-speed memory medium 6 such as a magnetic disk which reads and writes at a lower speed than an electronic disk. Some of the divided storage units in the database 10 are stored in the high-speed memory medium 5 and others are stored in the low-speed memory medium 6.

The system buffers 2a to 2m temporarily store and hold the storage units read from the database 10 for retrieval and updating by processing programs 1a to 1n. The medium storing area 7 may be embodied as a single component with a memory device such as a RAM or may be incorporated in the main memory (not shown). When storage units are read from the database 10 to the system buffers 2a to 2m, information for separate exclusive control of each storage unit is written to the exclusive control table 9.

The system buffer input means 3 reads storage units from the database 10 and stores them to some of the system buffers 2a to 2m according to the instruction from the database control unit 8. At the same time, whether the source of the read storage units is the high-speed memory medium 5 or the low-speed memory medium 6 is stored to the medium storing area 7 and the exclusive control table 9 is updated so that the applicable storage units are placed under exclusive control.

When one of the processing programs 1a to 1n is completed, the system buffer output means 4 writes to the database 10 the updated storage units among those read to system buffers 2a to 2m for the completed processing programs according to the instruction from the database control unit 8. Here, reference may be made to the medium storing area 7 and priority is placed to the storage units whose source is the high-speed memory medium 5 in writing to the database 10. In addition, when writing is completed, the exclusive control table 9 is updated so that the written storage units are released from exclusive control.

Figure 2:
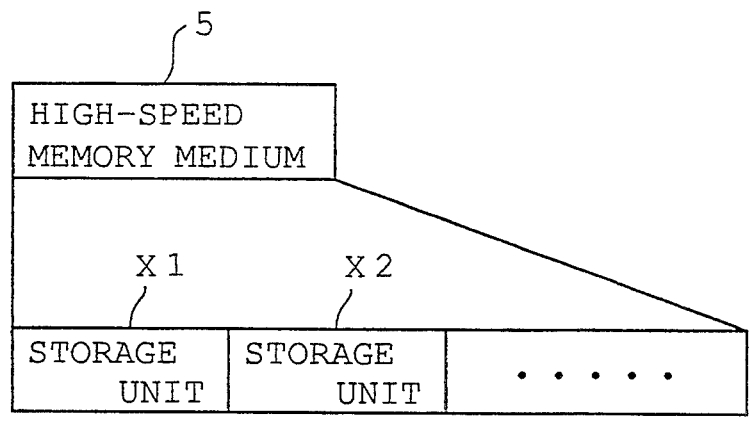
FIG. 2 is a diagram to show how storage units are stored in a high-speed memory medium.
Figure 3:
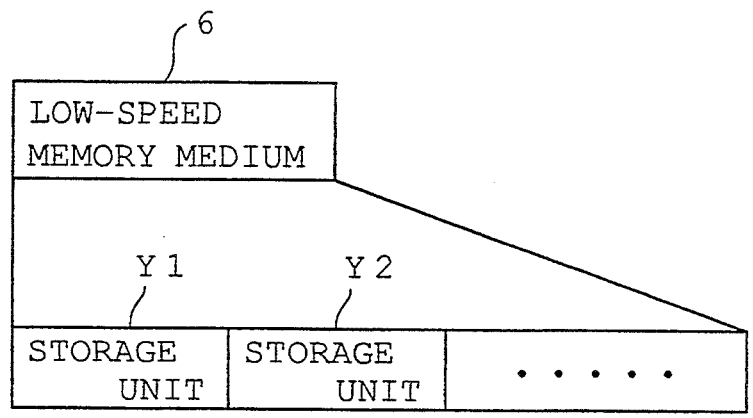
FIG. 3 is a diagram to show how storage units are stored in a low-speed memory medium.

Referring to FIG. 2, the high-speed memory medium 5 of the database 10 stores a plurality of storage units X1, X2, . . . and as shown in FIG. 3, the low memory medium 6 of the database 10 stores a plurality of storage units Y1, Y2, . . .

Figure 4:
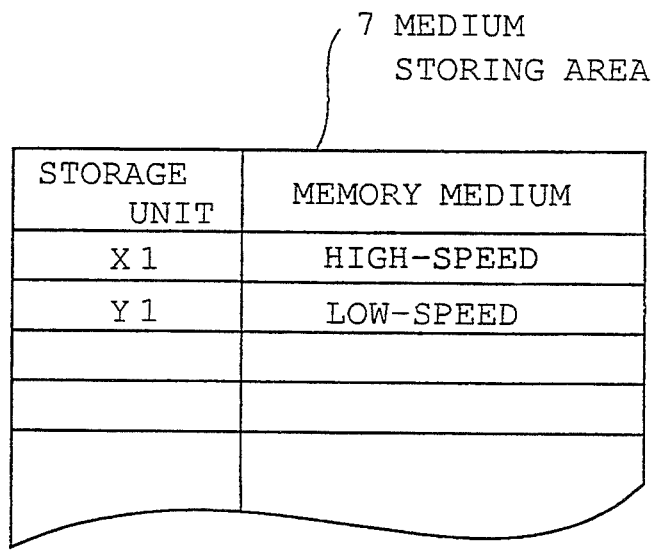
FIG. 4 is a diagram to show memory contents of a medium storing area.

FIG. 4 shows the data stored in the medium storing area 7. As shown in the figure, the medium storing area 7 stores the source memory medium (high-speed memory medium 5 or low-speed memory medium 6) for each storage unit read to the system buffers 2a to 2m as shown in FIG. 4. Such data are stored in the order beginning with the storage units from the high-speed memory medium 5.

Figure 5A:
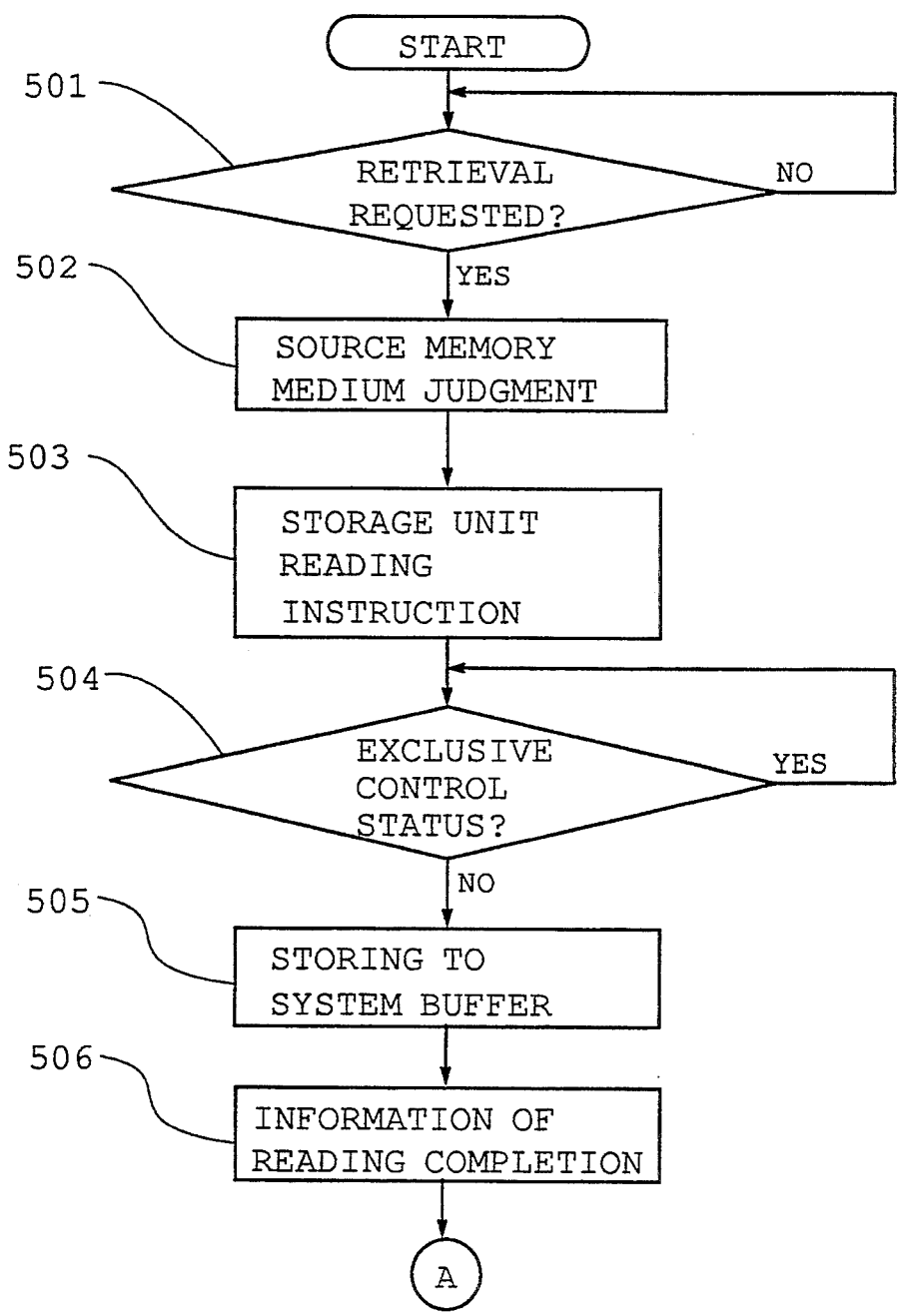
FIGS. 5a and 5b provide a flowchart to show the processing by the whole database according to FIG. 1.
Figure 5B:
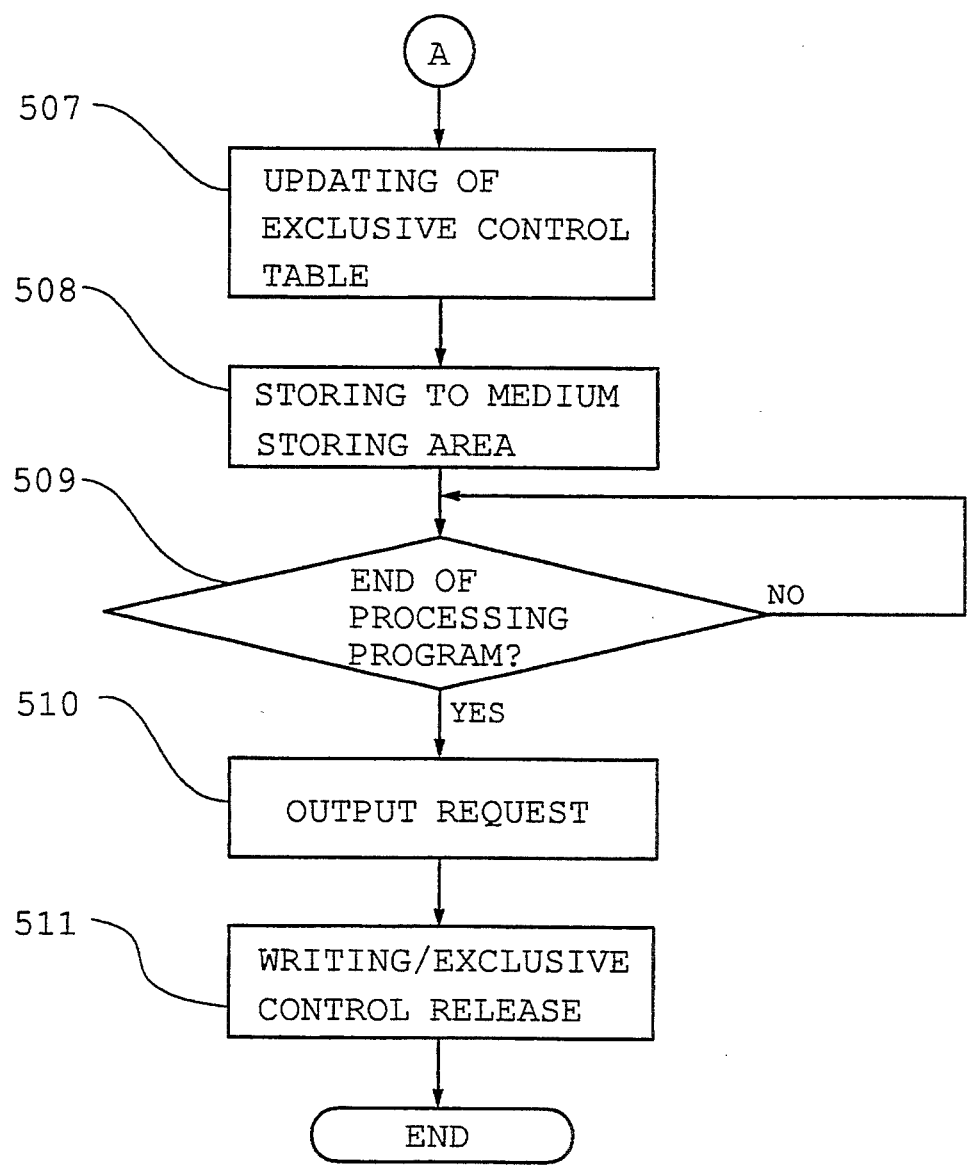
Figure 6:
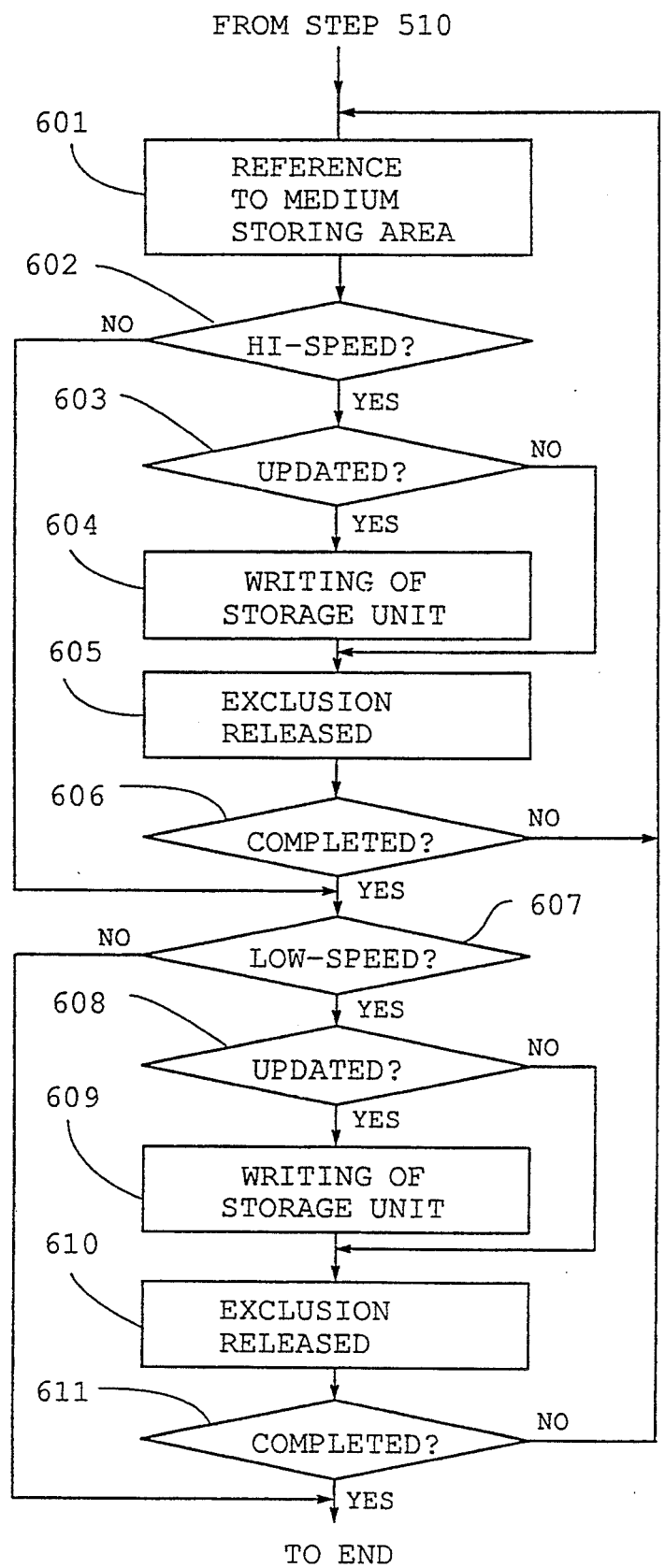
FIG. 6 is a flowchart to show the processing including writing from the system buffer to the database and release of exclusive control.

Next referring to the flowcharts of FIGS. 5a, 5b and 6, the operation of a database system having the above configuration according to this embodiment is described.

For example, when the processing program 1a requests retrieval processing of a certain storage unit (Storage unit X1 in FIG. 2, for example) (Step 501), the database control unit 8 judges that the requested storage unit X1 exists in the high-speed memory medium 5 of the database 10 based on internal administration information (Step 502) and instructs the system buffer input means 3 to write the storage unit X1 in the high-speed memory medium 5 to the specified system buffer among the system buffers 2a to 2m (Step 503).

The system buffer input means 3, which receives the writing instruction, refers to the exclusive control table 9 upon writing instruction and judges whether the storage unit X1 is already in the exclusive control status. If the unit is under exclusive control, the system waits for the release of exclusive control (Step 504). If the storage unit X1 is not under exclusive control, the storage unit X1 is read from the high-speed memory medium 5 and stored to the system buffer 2a, for example (Step 505), and completion of reading is informed to the database control unit 8 (Step 506), so that the processing program 1a can access the storage unit X1.

Here, the system buffer input means 3 updates the exclusive control table 9 to put the storage unit X1 in exclusive control status (Step 507) and at the same time stores the information to the effect that the source of the storage unit X1 is the high-speed memory medium 5 to the medium storing area 7 as shown in FIG. 4 (Step 508).

If the processing program 1a subsequently requests retrieval processing of the storage unit Y1, procedures similar to the steps 502 to 508 above are followed. Specifically, the system buffer input means 3 reads the storage unit Y1 from the low-speed memory medium 6 according to the instruction from the database control unit 8 and stores it to the system buffer 2b, for example. Then it informs the database control unit 8 of the completion of reading and enables the processing program 1a to access the storage unit Y1. Here, the system buffer input means 3 updates the exclusive control table 9 to put the storage unit Y1 in exclusive control status and at the same time stores the information to the effect that the source of the storage unit Y1 is the low-speed memory medium 6 to the medium storing area 7.

After that, whether the processing program 1a completes its operation or not is judged (Step 509). If the processing program 1a completes the operation with updating the storage units X1 and Y1, which are read to the system buffers 2a and 2b, for example, then the database control unit 8 sends an output request to the system buffer output means 4 with specifying the storage units X1 and Y1 stored in the system buffers 2a and 2b for the completed processing program 1a and the system buffers 2a and 2b (Step 510). The specification of the system buffers 2a and 2b here may be made by specification of serial numbers given to the system buffers 2a to 2m, for example.

Then, the system buffer output means 4, which receives the output request, writes the storage units X1 and Y1 in the system buffers 2a and 2b to the data base 10 and updates the exclusive control table 9 so that the exclusive control is released (Step 511). The system buffer output means 4 refers to the medium storing area 7 and places priority to storage units whose source is the high-speed memory medium 5 in writing operation and releases the storage units from exclusive control upon completion of their writing.

Writing and exclusive control release at Step 511 are described in detail below referring to the flowchart of FIG. 6. The system buffer output means 4, in response to the output instruction from the database control unit 8, first refers to the medium storing area 7 (Step 601) and judges whether the sources of the storage units in the system buffers 2a and 2b are the high-speed memory medium 5 (Step 602).

In the above example, the source of the storage unit X1 in the system buffer 2a is the high-speed memory medium 5. Next, judgment is made on whether this storage unit X1 has been updated (Step 603). If the storage unit X1 has been updated, the system buffer output means 4 writes the storage unit X1 to the high-speed memory medium 5 of the database 10 (Step 604), and upon completion of this writing, updates the exclusive control table 9 to release the storage unit X1 from exclusive control (Step 605) and enables the updated storage unit X1 to be accessed from other processing programs. If it is learned that the storage unit X1 has not been updated at Step 603, writing to the high-speed memory medium 5 is not performed and exclusive control is released as Step 605. The above procedures are repeated until writing and exclusive control release of all storage units whose sources are the high-speed memory medium 5 are completed (Step 606).

When writing and exclusion release for all storage units whose sources are the high-speed memory medium 5 are completed in Step 606 or when there is not any storage unit whose source is the high-speed memory medium 5 in Step 602, judgment is made on whether storage units in the system buffers 2a and 2b are from the low-speed memory medium 5 (Step 607).

In the above example, the source of the storage unit Y1 existing in the system buffer 2b is the low-speed memory medium 6. Next, judgment is made on whether this storage unit Y1 has been updated (Step 608). If the storage unit Y1 has been updated, the system buffer output means 4 writes the storage unit Y1 to the low-speed memory medium 6 of the database 10 (Step 609), and upon completion of this writing, updates the exclusive control table 9 to release the storage unit Y1 from the exclusive control (Step 610) and enables the updated storage unit Y1 to be accessed from other processing programs. If the storage unit Y1 has not been updated in Step 608, writing to the low-speed memory medium 6 is not performed and exclusive control is released as Step 608. The above procedures are repeated until writing and exclusive control release of all the storage units whose sources are the low-speed memory medium 6 are completed (Step 611).

The database system of this embodiment places priority to the storage units whose source memory medium is the high-speed memory medium when writing updated storage units among those in the system buffers 2a to 2m to the database 10 upon completion of the processing programs 1a to 1n by referring to the medium storing area 7 as described above. Priority to the storage units from the high-speed memory medium 5 is also placed for exclusive control release. Accordingly, the more storage units from the high-speed memory medium 5 exist in the system buffers 2a to 2m, the quicker the storage units are released from exclusive control after the completion of the processing programs 1a to 1n. Thus, the average exclusive control period of the storage units is reduced, which results in an improved throughput of the whole system.

Figure 7:
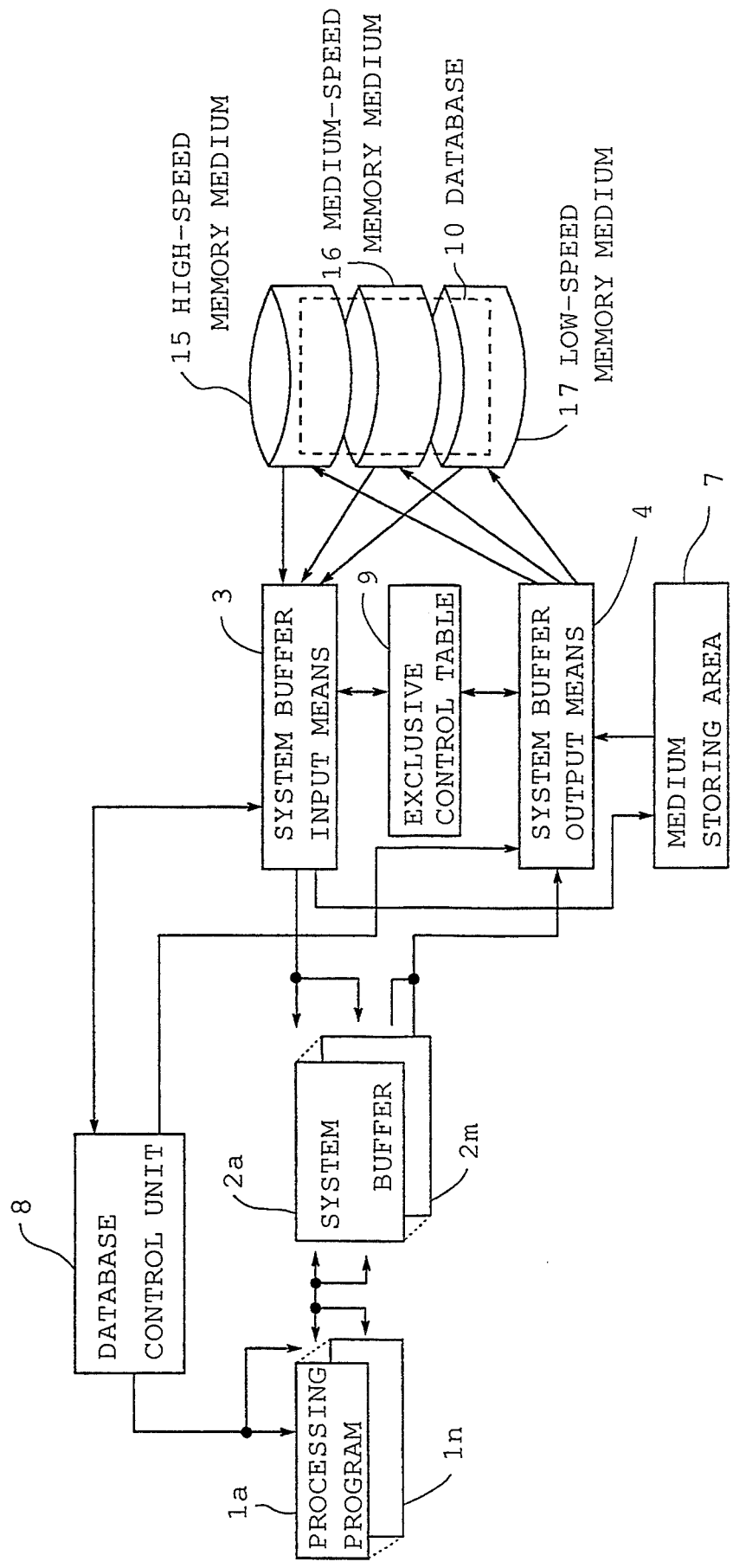
FIG. 7 is a block diagram to show the configuration of a database system according toga second embodiment of the present invention.

FIG. 7 shows a database system according to a second embodiment of the present invention. In the embodiment, the database 10 comprises three memory media: high-speed, medium-speed and low-speed media. Specifically, the system has a high-speed memory medium 15 such as an electronic disk, a medium-speed memory medium 16 such as an optical disk and a low-speed memory medium 17 such as a magnetic disk, each storing some storage units. Except this point, the system has the same configuration as the one shown in FIG. 1. In case of the database system according to this embodiment, writing and exclusive control release of storage units are performed according to the same procedures as described above in the order of the high-speed memory medium 15, the medium-speed memory medium 16 and then the low-speed memory medium 17.

It may be considered that writing and exclusive control release can be performed for each storage unit in the order of system buffer numbers without placing priority to a higher speed memory medium. This method also can make the exclusive control period slightly shorter than conventional systems where exclusive control is released only after writing of all storage units are completed, certainly. However, if the system buffer with the smallest number contains storage units from the low-speed memory medium, it takes time to write these units to the database. Accordingly, this invention where the priority is placed to the storage units from the high-speed memory medium can make the average exclusive control period much shorter.

It is obvious that the invention is not limited to the above embodiments and various modifications are possible. For example, the database comprises high-speed and low speed memory media or high-, medium- and low-speed media in the above embodiments, but it can have more memory media for more speed levels. Variations within the true spirit or scope of the invention are covered by the appended claims.

What is claimed is:

1. A method of retrieving storage units from and storing storage units to a database in a database system, the database containing a plurality of media, each of the media having a processing speed, the database system including a plurality of numerically designated system buffers, an input/output section, a control table, a medium storing area and a database control unit, the database system being accessed by a plurality of processing programs, the method comprising the steps of:

retrieving, via the input/output section, storage units from the database in response to requests from the processing programs;

storing each of the retrieved storage units in a separately numbered one of the system buffers;

storing, in the medium storing area, for each retrieved storage unit, an indication of the processing speed of the medium from which the storage unit was retrieved;

controlling, by updating the control table, the storage units to prevent access of the retrieved storage units by other processing programs;

updating the storage units upon completion of a processing program;

referring to the medium storing area to determine the processing speeds of the media from which the storage units were retrieved;

storing the updated storage units in the database in an order corresponding to the processing speeds of the media from which the storage units were retrieved, such that the storage units retrieved from media having higher processing speeds are stored before storage units retrieved from media having lower processing speeds; and releasing each of the storage units from control when the storage unit is written to the database.

2. A database system comprising:

a database for storing a plurality of storage units assigned to different types of memory media having different processing speeds, the different types of memory media being accessible from a plurality of processing programs;

a plurality of storing means, each storing means being adapted to read one of the storage units from the database and store said one of the storage units therein;

exclusive controlling means for setting said one of the storage units being read to be under an exclusive control condition to prevent said one of the storage units from being accessed by other processing programs;

medium speed storing means for storing the processing speed of the memory medium each time one of the storage units is read by one of said plurality of storing means;

input/output means for reading storage units from the database to the storing means and writing storage units from the storing means to the database; and input/output control means for controlling the reading from and writing to the storing means;

wherein the input/output means, in response to a write command from said input/output control means, refers to the medium speed storing means and writes the updated storage units to the database in order of the storage units assigned the highest speed memory medium, and wherein the input/output means updates the exclusive controlling means to release the applicable storage units from the exclusive control condition upon completion of writing to the database.

3. A database system of claim 1, wherein the memory media comprise a first memory medium for reading and writing at a high speed and a second memory medium for reading and writing at a lower speed than the first memory medium.

4. A database system of claim 3, wherein the first memory medium comprises an electronic disk and the second memory medium comprises a magnetic disk.

5. A database system of claim 1, wherein the memory media comprise a first memory medium for reading and writing at a high speed, a second memory medium for reading and writing at a lower speed than the first memory medium, and a third memory medium for reading and writing at a lower speed than the second memory medium.

6. A database system of claim 5, wherein the first memory medium comprises an electronic disk, the second memory medium comprises an optical disk, and the third memory medium comprises a magnetic disk.

7. A database system comprising;

a database for storing a plurality of storage units assigned to different types of memory media having different processing speeds, the different types of memory media being accessible from a plurality of processing programs;

a plurality of storing means, each storing means being adapted to read one of the storage units from the database and store said one of the storage units therein;

exclusive controlling means for setting said one of the storage units being read to be under an exclusive control condition to prevent said one of the storage units from being used by other processing programs;

medium speed storing means for storing the processing speed of the memory medium each time one of the storage units is read by one of said plurality of storing means;

input/output means for reading storage units from the database to the storing means and writing storage units from the storing means to the database; and input/output control means for controlling the reading from and writing to the storing means, wherein the input/output means, in response to a read command from the input/output control means, reads storage units to the storing means and at the same time updates the exclusive controlling means to place the applicable storage units under the exclusive control condition and stores the processing speed of the source memory medium for each storage unit, wherein the input/output means, in response to a write command from said input/output control means, refers to the medium speed storing means and writes the updated storage units to the database in order of the storage units assigned the highest speed memory medium, and wherein the input/output means updates the exclusive controlling means to release the applicable storage units from the exclusive ,control condition upon completion of writing to the database.

* * * * *